Patented Dec. 29, 1942

2,306,697

UNITED STATES PATENT OFFICE 2,306,697

PRODUCTION OF UREA-FORMALDEHYDE MOLDING MIXTURES

John Edward Howard Hayward, London, England, assignor, by mesne assignments, to Bakelite Corporation, a corporation of New Jersey No Drawing. Application May 12, 1939, Serial No. 273,279. In Great Britain May 21, 1938

1 Claim. (Cl. 260—69)

The invention relates to the production of molding mixtures containing synthetic resins obtained from formaldehyde and urea or thiourea or mixtures of urea and thiourea. In the following description when urea is referred to it is to be understood that thiourea or mixtures of urea and thiourea can be substituted.

The physical and chemical nature of the condensation products of urea and formaldehyde precludes an exact investigation of the chemical changes, but one can conveniently consider the initial reaction as a condensation reaction leading to the formation of a moldable product, and the final reaction in the mold as a polymerisation reaction giving a hard infusible product. In the production of urea-formaldehyde moldings it is desirable that the initial condensation should be carried out under alkaline conditions, whilst the polymerisation in the mold should be carried out under acid conditions. The usual method of producing urea-formaldehyde molding mixtures comprises heating an aqueous mixture of formaldehyde, uera and a condensing agent, mixing the reaction mixture, if desired after concentration, with a filler and drying and grinding the mass thus obtained. As it is difficult to incorporate an acid substance, for example by simple mixing, with the powder in order to obtain acid conditions during molding, various suggestions have been made to add to the liquid reaction mixture substances, e. g., β-brom-hydrocinnamic acid, which when added will not affect the pH conditions of the reaction mixture but which, during molding, will decompose to liberate acid.

It has now been found that by careful control of the times and temperatures of heating during the condensation reaction an acid such as hydrochloric acid, which under other conditions would affect the pH value when added, may be added as the polymerising agent either to the mixture of raw materials or to the liquid reaction mixture at any time prior to the mixing with the filler without causing a change-over from alkaline to acid conditions. The control necessary consists essentially in using relatively low temperatures (for example not above 80° C.) and relatively short periods of heating (for example 15 to 30 minutes). It is found that higher temperatures can be employed provided the time of heating is very short, similarly longer periods of heating can be employed provided the temperatures are low. In all cases preliminary tests should be made to ascertain the exact times and temperatures which will give a sufficient degree of condensation without the pH value falling below 7 during the condensation reaction.

The process according to the present invention for the production of urea-formaldehyde molding mixtures thus comprises heating to effect condensation an aqueous mixture of 1 molecular proportion of urea and/or thiourea with about 1.25 to 2.5 molecular proportions of formaldehyde and sufficient alkaline condensing agent to give alkaline conditions during the condensation, mixing the reaction mixture with a filler and drying the mass so obtained, wherein the condensing agent employed is ammonia, methylamine, ethylamine, ethylenediamine, an amylamine, a propylene diamine, a phenylene diamine or triethanolamine, and at any time prior to the mixing with the filler an acid polymerising agent is added and the times and temperatures of the condensation reaction and the relative quantities of acid polymerising agent and alkaline condensing agent are so controlled that the alkaline conditions are maintained throughout.

The molding mixture obtained by the process of the invention thus comprises a filler and a urea-formaldehyde synthetic resin which has an acid polymerising agent incorporated with it but has an alkaline reaction. Molded articles can be produced by subjecting the molding mixture to heat and pressure in accordance with known practice.

Mixtures of the condensing agents specified may be employed and it is found particularly effective to employ a mixture of triethanolamine and one or more of the other condensing agents.

Although in carrying out the process of the invention it is preferred to use an acid as such as polymerising agent, it is possible to add the acid in the form of a salt of the acid and the alkaline condensing agent employed, for example when ammonia is used as the condensing agent ammonium chloride may be employed as the acid polymerising agent.

It is found that satisfactory results are not obtained if the relative molecular proportions of formaldehyde to urea are greater than about 2.5:1 or less than about 1.25:1, and preferably a ratio of 1½:1 is employed.

The preferred basic condensing agent is ammonia and the preferred acid polymerising agent is hydrochloric acid, these two compounds being both cheap and highly effective. Other acids may however be employed, for example oxalic acid and succinic acid. With weak acids the quantity used must necessarily be greater than with the stronger acids.

In addition to the filler, the other usual materials included in molding mixtures may be added, for example colouring matter, lubricants and plasticisers. Suitable plasticers are ethylene glycol, diethylphthalate, dibutyl-phthalate, glyceryl monostearate and glyceryl distearate, the last two conveniently being employed in the emulsified form.

Examples of the process of production of urea-formaldehyde molding mixtures in accordance with the invention are as follows:

Example I

The following mixture was made up, the reactants being added in the order given:

| | Pounds |
|---|---|
| Formalin (37½% by weight formaldehyde) having an acid value of about 50 mgm. KOH per 100 mls | 40 |
| Ammonia (.910 specific gravity) | 2.49 |
| Urea (commercial product) | 21 |

The reaction mixture was heated in a still under such conditions that the temperature rose to 80° C. in 20 minutes. The product was then cooled and the pH value of the cold liquid was about 8.5.

90 ccs. of 1.0 normal hydrochloric acid were then stirred into the cold liquid.

The mixture was then dehydrated by heating under a vacuum of 25 inches of mercury, the temperature not being allowed to rise above 60° C. A fall in the pH value to 8 took place during the dehydration. (Experience has shown that a greater fall will take place if higher temperatures are employed and in consequence care must be taken during such a dehydration step to avoid a fall in the pH value below the neutral point.) During the dehydration step about half the total quantity of water present was removed and a yield of 48 lbs. of concentrated syrup (a watery solution of the resin) was obtained.

The concentrated syrup was then mixed with 16 lbs. of wood flour and with other usual additions, e. g. colouring matter, lubricants and plasticisers.

After being well mixed the mass was dried in a vacuum drier at a temperature of about 70° C. under a vacuum of 26 inches of mercury; the dried mass was treated on heated mixing rolls to obtain the required plasticity, the sheets removed from the rolls and, after being allowed to cool, were ground up to give the finished molding powder.

Experience has shown that the concentrated syrup obtained in such a process must be mixed with the filler and dried shortly after its formation, otherwise the resin solidifies and eventually, for example after two days, the pH value drops below 7 and it is no longer possible to mix the resin satisfactorily with the filler.

Example II

The following mixture was made up, the reactants being added in the order given:

| | Pounds |
|---|---|
| Formalin (37½% by weight formaldehyde) | 40 |
| Triethanolamine | 0.3 |
| Urea | 21 |

The same procedure was followed as in Example I except that 150 ccs. of 1.0 normal hydrochloric acid were employed.

Example III

The following mixture was made up, the reactants being added in the order given:

| | Pounds |
|---|---|
| Formalin (37½% by weight formaldehyde) | 40 |
| Triethanolamine | 0.1 |
| Ammonia (.910 specific gravity) | 2.0 |
| Urea | 21 |

The same procedure was followed as in Example I including the use of 90 ccs. of 1.0 normal hydrochloric acid.

Example IV

The following mixture was made up, the reactants being added in the order given:

| | Pounds |
|---|---|
| Formalin (37½% by weight formaldehyde) | 40 |
| Ethylenediamine | 1 |
| Urea | 21 |

The reaction mixture was heated in a still under such conditions that the temperature rose to 80° C. in 20 minutes. The product was then cooled and the pH value of the cold liquid was about 8.5.

20 grams of succinic acid were stirred into the cold liquid.

16 lbs. of paper pulp were then incorporated, and other usual additions, e. g., colouring matter, lubricants and plasticisers were also incorporated.

The mass was then dried, rolled to the desired plasticity and ground as in the previous examples.

I claim:

Process for the production of urea-formaldehyde molding mixtures which comprises causing a condensation by heating, at a temperature not to exceed 80° C. for a period not to exceed about 30 minutes, an aqueous mixture of one molecular proportion of a urea with from about 1.25 to 2.50 molecular proportions of formaldehyde and an alkaline condensing agent selected from the group consisting of ammonia, methylamine, ethylamine, ethylenediamine, amylamines, propylenediamines, phenylenediamines and triethanolamine, adding hydrochloric acid polymerizing agent to the reaction mixture at any stage of the condensation prior to the addition thereto of any filler material, the amounts of alkaline condensing agent and hydrochloric acid polymerizing agent employed being so adjusted with respect to each other that the pH value of the reaction mixture is maintained at substantially above 7 throughout the condensation, dehydrating the resulting mixture at a temperature not exceeding 60° C., incorporating a filler in the alkaline-reacting acid-containing reaction mass after the condensation, and thereafter drying and treating on heated mixing rolls to give a molding mixture.

JOHN EDWARD HOWARD HAYWARD.